United States Patent
Song (10) Patent No.: US 12,418,186 B2
(45) Date of Patent: Sep. 16, 2025

(54) CELL PROTECTION CIRCUIT, BATTERY, AND ELECTRONIC DEVICE

(71) Applicant: Ningde Amperex Technology Limited, Ningde (CN)

(72) Inventor: Chuantao Song, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 825 days.

(21) Appl. No.: 17/692,380

(22) Filed: Mar. 11, 2022

(65) Prior Publication Data

US 2022/0294091 A1   Sep. 15, 2022

(51) Int. Cl.
*H02J 7/00* (2006.01)
*H01M 50/581* (2021.01)

(52) U.S. Cl.
CPC ....... *H02J 7/00309* (2020.01); *H01M 50/581* (2021.01); *H02J 7/00714* (2020.01); *H02J 7/007192* (2020.01)

(58) Field of Classification Search
CPC .................................................. H02J 7/00309
USPC ....................................................... 320/136
See application file for complete search history.

(56) References Cited

U.S. PATENT DOCUMENTS

| | | | | |
|---|---|---|---|---|
| 2010/0277132 A1* | 11/2010 | Hara | .................. | B60L 50/16 320/163 |
| 2010/0316892 A1* | 12/2010 | Kim | .................. | H01M 10/425 429/7 |
| 2011/0248653 A1* | 10/2011 | Brotto | .................. | H01R 13/112 318/139 |
| 2019/0245192 A1* | 8/2019 | Song | .................. | H01H 71/14 |
| 2019/0372179 A1* | 12/2019 | Singer | .................. | H01M 10/635 |

FOREIGN PATENT DOCUMENTS

| | | |
|---|---|---|
| CN | 202495751 U | 10/2012 |
| CN | 202996742 U | 6/2013 |
| CN | 105140075 A | 12/2015 |
| CN | 206202017 U | 5/2017 |
| CN | 206685887 U | 11/2017 |
| CN | 109818111 A | 5/2019 |
| JP | 2009-131020 A | 6/2009 |

OTHER PUBLICATIONS

Office Action dated Dec. 27, 2023, issued in counterpart CN Application No. 202110263511.2. (8 pages).

\* cited by examiner

*Primary Examiner* — Jerry D Robbins
(74) *Attorney, Agent, or Firm* — WHDA, LLP (57) ABSTRACT

A protection circuit in this application is electrically connected between a first tab and a second tab of a cell. The protection circuit includes a first branch circuit or includes a first branch circuit and a second branch circuit that are connected in parallel. When a temperature of the cell is greater than or equal to a first temperature threshold, the cell is discharged through the first branch circuit. When the temperature of the cell is greater than or equal to a second temperature threshold, the cell is discharged through both the first branch circuit and the second branch circuit. The second temperature threshold is greater than the first temperature threshold.

17 Claims, 9 Drawing Sheets

SOC of the first cell

CELL PROTECTION CIRCUIT, BATTERY, AND ELECTRONIC DEVICE

CROSS-REFERENCE TO RELATED APPLICATIONS

This application claims the benefit of priority from the Chinese Patent Application No. 202110263511.2, filed on Mar. 11, 2021, which is incorporated herein by reference in its entirety.

TECHNICAL FIELD

This application relates to the technical field of battery safety, and in particular, to a cell protection circuit, a battery, a battery pack, and an electronic device.

BACKGROUND

The temperature of a cell may increase with gradual increase of the voltage and energy density of the cell during charging. The continuous rise of the temperature makes thermal stability of the cell hardly meet requirements, resulting in a gradual decline in the reliability and safety of the cell. At an extremely high temperature, the cell may generate heat extraordinarily, or even incur thermal runaway or failure.

Currently, high heat emission is generally avoided by replacing a positive electrode material, a negative electrode material, or an electrolytic solution, or by other means. However, replacing the material may impair other performance indicators of the cell. For example, adding a safety additive into the electrolytic solution can improve the thermal stability of the cell, but may reduce the energy density of the cell, thereby impairing the fast charge performance of the cell.

SUMMARY

In view of the foregoing, embodiments of this application provide a cell protection circuit, a battery, a battery pack, and an electronic device to achieve a tradeoff between thermal stability and other performance indicators of a cell, and improve the thermal stability of the cell without impairing other performance indicators of the cell, thereby improving reliability and safety of the cell under a high temperature.

An embodiment of this application provides a cell protection circuit. The protection circuit is electrically connected between a first tab and a second tab of a cell. The protection circuit includes a first branch circuit or includes a first branch circuit and a second branch circuit that are connected in parallel. When a temperature of the cell is greater than or equal to a first temperature threshold, the cell is discharged through the first branch circuit.

In an implementation, when the temperature of the cell is greater than or equal to a second temperature threshold, the cell is discharged through both the first branch circuit and the second branch circuit. The second temperature threshold is greater than the first temperature threshold.

In an implementation, when the temperature of the cell is greater than or equal to the first temperature threshold, the first branch circuit is in the working state, and the second branch circuit is in a non-discharging state.

In an implementation, the first branch circuit includes a first switch and a first energy converter that are connected in series. When the temperature of the cell is greater than or equal to the first temperature threshold, the first switch performs a closing action, so that the cell is discharged through the first energy converter.

In an implementation, the first branch circuit further includes a timer. The timer is connected to the first switch and the first energy converter in series, and is configured to record a discharge time of the cell.

In an implementation, the second branch circuit includes a second switch and a second energy converter that are connected in series. When the temperature of the cell is greater than or equal to the second temperature threshold, the second switch performs a closing action, so that the cell is discharged through the first energy converter and the second energy converter.

In an implementation, the first branch circuit stops working in a case that the temperature of the cell falls below a minimum value of a value range of the first temperature threshold (for example, below 60° C.) or in a case that a depth of discharge of the cell exceeds a depth-of-discharge threshold when the first branch circuit is in the working state. The depth of discharge means a percentage of a discharged capacity in a rated capacity of the cell.

In an implementation, the depth-of-discharge threshold is in positive correlation with the first temperature threshold. The first temperature threshold is greater than or equal to 60° C. and less than or equal to 90° C. The second temperature threshold is greater than 90° C.

In an implementation, the depth-of-discharge threshold correlates with a discharge rate and a discharge time. When the discharge rate is constant, the depth-of-discharge threshold is in positive correlation with the discharge time. The discharge rate means a current intensity required for discharging the cell to make a discharged capacity reach the rated capacity within a specified time length.

In an implementation, the second branch circuit stops working in a case that the temperature of the cell falls below a minimum value of a value range of the second temperature threshold (for example, is less than or equal to 90° C.) when the second branch circuit is in the working state.

In an implementation, both the first branch circuit and the second branch circuit stop working in a case that the depth of discharge of the cell is 100%.

In an implementation, the first energy converter and the second energy converter each include at least one power consumption device. The power consumption device includes at least one of a mechanical energy device, an acoustic energy device, or an optical energy device. When there are two or more power consumption devices, the power consumption devices are connected to each other in parallel and/or in series.

In an implementation, the power consumption device includes a resistor and a heat insulation layer. The heat insulation layer at least partly encloses the resistor.

In an implementation a resistance R of the first energy converter is:

$$R=U/(X*Y)$$

where, Y is a rated capacity of the cell, U is an output voltage of the cell, X is a discharge rate of the cell, and the discharge rate means a current intensity required for discharging the cell to make a discharged capacity reach the rated capacity within a specified time length.

In an implementation, a power W of the first energy converter is:

$$W=U*(K*Y/T)$$

where, K is a depth of discharge of the cell, and T is a discharge time of the cell.

In an implementation, the first switch includes: a first conductive terminal, where the first conductive terminal is electrically connected to a tab, and the tab is disposed on a positive electrode or a negative electrode of the cell; a second conductive terminal, where the second conductive terminal is electrically connected to the first energy converter; and an elastic part. The second conductive terminal is disposed between the first conductive terminal and the elastic part. The elastic part is elastically deformed upon a temperature change to push the second conductive terminal to contact the first conductive terminal, so that the first switch performs the closing action.

In an implementation, the first switch includes: a first conductive terminal, where the first conductive terminal is electrically connected to a tab, and the tab is disposed on a positive electrode or a negative electrode of the cell; a second conductive terminal, where the second conductive terminal is electrically connected to the first energy converter; and a metal block. The metal block at least partly contacts the first conductive terminal or the second conductive terminal. When the temperature of the cell is greater than or equal to the first temperature threshold, the metal block melts to implement electrical connection between the first conductive terminal and the second conductive terminal, so that the first switch performs the closing action.

An embodiment of this application further provides a battery. The battery includes a cell and any one of the foregoing protection circuits. The protection circuit is electrically connected between a first tab and a second tab of the cell.

An embodiment of this application further provides a battery pack. The battery pack includes a plurality of batteries. The plurality of batteries are connected to each other in series and/or in parallel. The plurality of batteries include at least one battery in which any one of the foregoing protection circuits is disposed.

An embodiment of this application further provides an electronic device. The electronic device includes a battery or a battery pack in which any one of the foregoing protection circuits is disposed.

In the embodiments of this application, the first branch circuit and/or the second branch circuit are disposed to consume the amount of charge of the cell, and can achieve a tradeoff between thermal stability and other performance indicators of a cell, and improve the thermal stability of the cell without impairing other performance indicators of the cell, thereby improving reliability and safety of the cell under a high temperature.

REFERENCE NUMERALS

10 Cell;
11 First tab;
12 Second tab;
13 Top sealing flap;
14 Cell body;
15 Conductive piece;
20 Protection circuit;
21 First branch circuit;
22 Second branch circuit;
211 First switch;
212 First energy converter;
213 Timer;
214 First conductive terminal;
215 Second conductive terminal;
216 Elastic part;
217 Prop structure;
218 Metal block;
221 Second switch;
222 Second energy converter;
60 External device;
61 Processor;
62 Charging device;
80 Power consumption device;
81 Housing;
82 Heat insulation layer;
83 Resistor;
84 Thermally conductive part;
85 Magnetic part;
86 Rotor;
30 Battery; and
40 Battery pack.

DETAILED DESCRIPTION

To make the foregoing objectives, features, and advantages of this application more comprehensible, the following describes this application in detail with reference to drawings and specific embodiments. It needs to be noted that to the extent that no conflict occurs, the embodiments of this application and the features in the embodiments may be combined with each other. For thorough understanding of this application, many details are given below. The embodiments described herein are merely a part of rather than all of the embodiments of this application.

Figure 1:
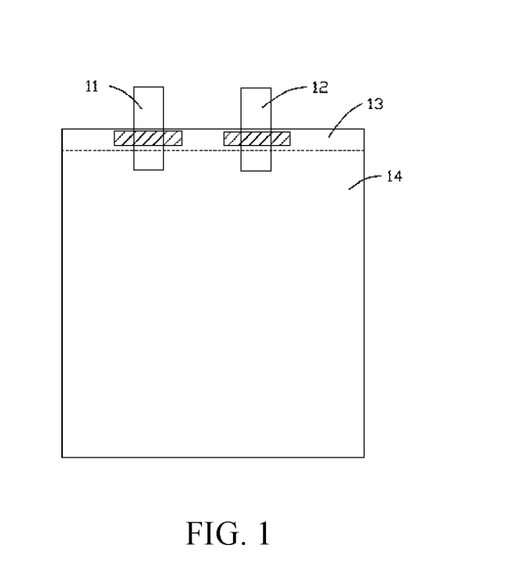
FIG. 1 is a schematic diagram of a packaged structure of a cell.

Referring to FIG. 1, FIG. 1 is a schematic diagram of a packaged structure of a cell 10. The cell 10 includes a first tab 11, a second tab 12, a top sealing flap 13, and a cell body 14. The cell body 14 includes a positive electrode plate (not shown in the drawing) and a negative electrode plate (not shown in the drawing). The top sealing flap 13 is disposed on the cell body 14. Both the first tab 11 and the second tab 12 are led out from the cell body 14 and pass through the top sealing flap 13. The first tab 11 is disposed on the positive electrode plate. The second tab 12 is disposed on the negative electrode plate.

When the cell 10 is being charged, heat is gradually accumulated inside the cell 10. As the temperature of the cell 10 rises, the reliability and safety of the cell 10 gradually decline, or even the cell 10 may emit heat abnormally.

In view of this, this application designs a protection circuit of the cell 10. When the temperature of the cell 10 reaches a temperature threshold, the protection circuit consumes the amount of charge of the cell 10, thereby increasing the reliability and a heat-resistance upper limit of the cell 10.

Understandably, when the cell 10 is being discharged, the capacity of the cell 10 decreases gradually, but the thermal stability increases gradually.

In this embodiment of this application, the capacity or amount of charge of the cell may be represented by a state of charge (SOC) of the cell. The state of charge is a percentage of a real-time capacity in a rated capacity of the cell.

Referring to FIG. 2 to FIG. 5, FIG. 2 to FIG. 5 are all schematic connection diagrams of a protection circuit 20, and FIG. 2 to FIG. 5 differ from each other in a location of the protection circuit 20 in the cell 10.

Figure 2:
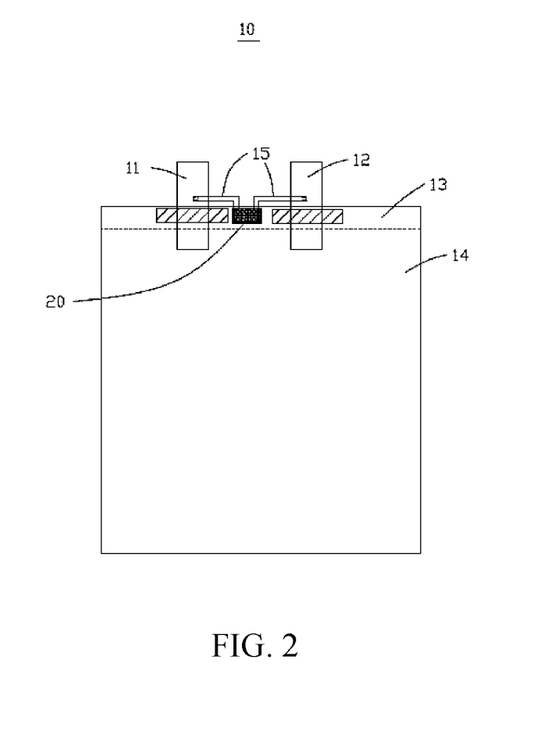
FIG. 2 is a schematic connection diagram of a protection circuit according to an embodiment.
Figure 3:
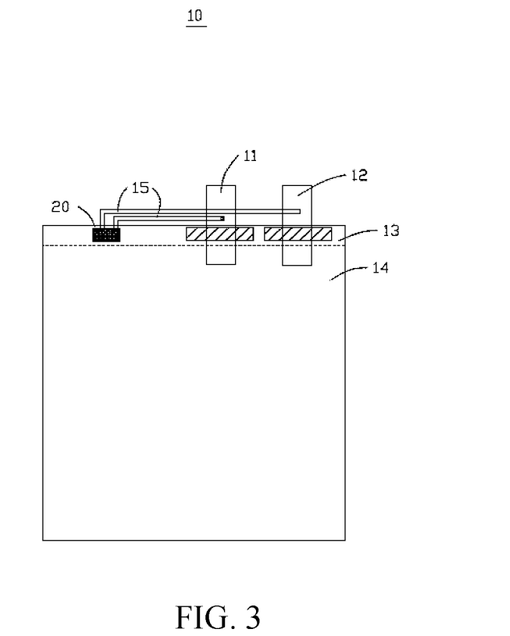
FIG. 3 is a schematic connection diagram of a protection circuit according to another embodiment.
Figure 4:
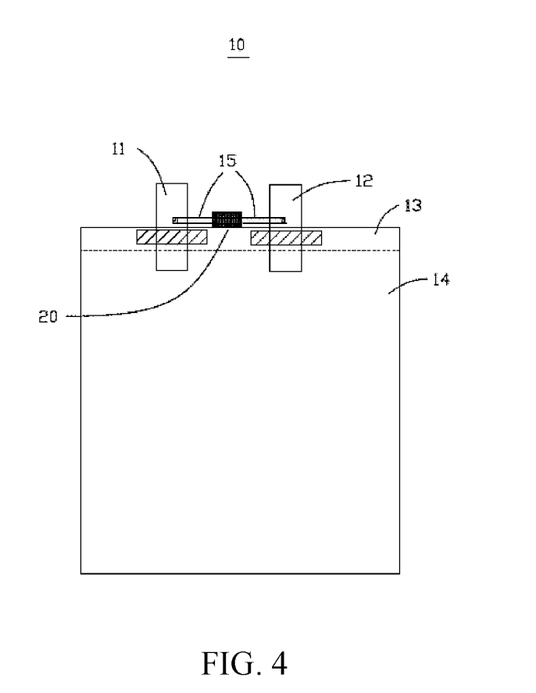
FIG. 4 is a schematic connection diagram of a protection circuit according to another embodiment.
Figure 5:
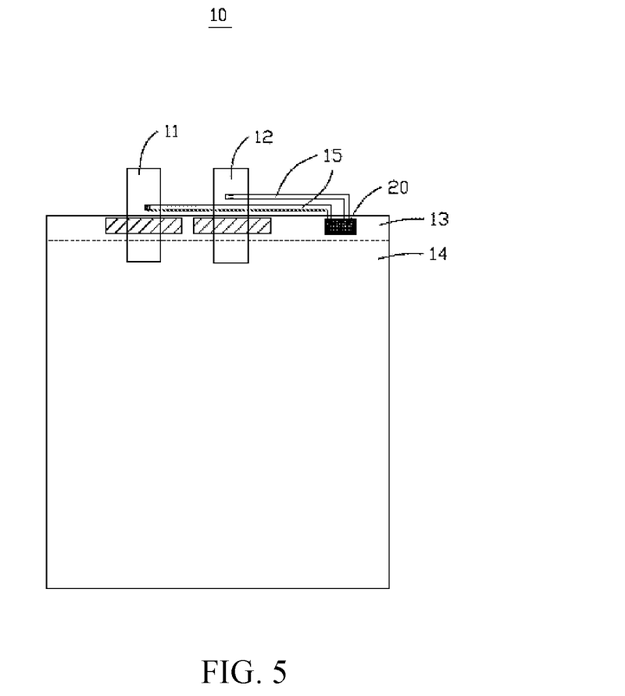
FIG. 5 is a schematic connection diagram of a protection circuit according to another embodiment.

Specifically, in FIG. 2, the protection circuit 20 is disposed inside the top sealing flap 13. The protection circuit 20 is electrically connected to the first tab 11 and the second tab 12 through a conductive part 15, and disposed between the first tab 11 and the second tab 12. FIG. 3 differs from FIG. 2 in that the first tab 11 is located between the protection circuit 20 and the second tab 12. FIG. 4 differs from FIG. 2 in that the protection circuit 20 is disposed outside the top sealing flap 13 and partly contacts the top sealing flap 13. FIG. 5 differs from FIG. 2 in that the second tab 12 is located between the protection circuit 20 and the first tab 11.

Figure 6:
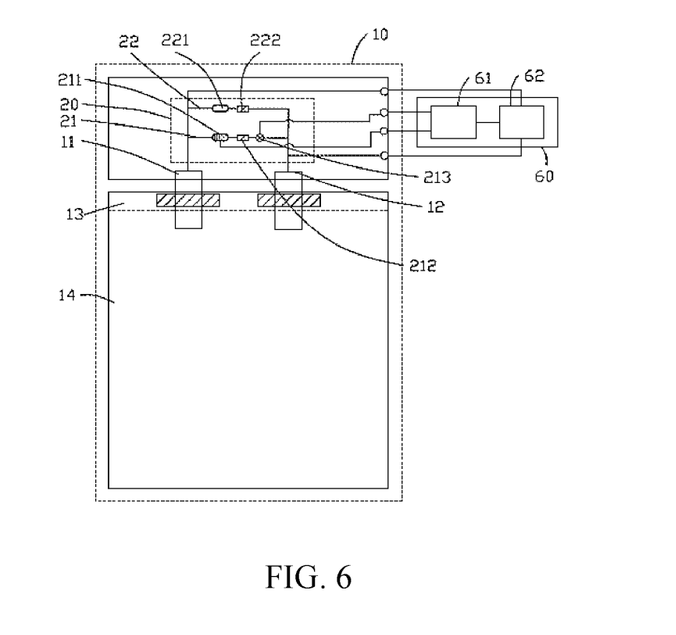
FIG. 6 is a schematic structural diagram of a protection circuit.

Referring to FIG. 1 and FIG. 6, FIG. 6 is a schematic structural diagram of the protection circuit 20. The protection circuit 20 includes a first branch circuit 21 or includes a first branch circuit 21 and a second branch circuit 22 that are connected in parallel (that is, includes the first branch circuit 21 alone, or includes both the first branch circuit 21 and the second branch circuit 22 that are connected in parallel). The first branch circuit 21 includes a first switch 211, a first energy converter 212, and a timer 213 that are connected in series. The second branch circuit 22 includes a second switch 221 and a second energy converter 222 that are connected in series.

When a temperature of the cell 10 is greater than or equal to a first temperature threshold T1, the first branch circuit 21 is in a working state. The working state means a state in which the cell 10 is discharged through the first branch circuit 21. The second branch circuit 22 is in a non-discharging state. In some embodiments, when the temperature of the cell 10 is greater than or equal to a second temperature threshold T2, the cell 10 is discharging though both the first branch circuit 21 and the second branch circuit 22. The second temperature threshold T2 is greater than the first temperature threshold T1. In some embodiments, the first temperature threshold T1 is greater than or equal to 60° C. and less than or equal to 90° C., and the second temperature threshold T2 is greater than 90° C.

Both the first energy converter 212 and the second energy converter 222 are configured to convert electrical energy emitted by the cell 10 into other forms of energy such as mechanical energy, acoustic energy, or optical energy. The first switch 211 is a controlled switch, and includes a first control end. The first switch 211 is electrically connected to an external device 60 through the first control end. The timer 213 includes a second control end. The timer 213 is electrically connected to the external device 60 through the second control end. The timer 213 is configured to record a discharge time of the cell 10. The cell 10 is electrically connected to the external device 60 through the first tab 11 and the second tab 12. The second switch 221 is a temperature switch. The second switch 221 senses a temperature change of the cell 10. When the temperature of the cell 10 meets an actuation condition of the second switch 221, the second switch 221 performs a closing action to turn on the second branch circuit 22.

Understandably, in other embodiments, both the first switch 211 and the second switch 221 may be temperature switches or controlled switches. The timer 213 is omissible, and a timer inside the external device 60 may record the discharge time of the cell 10.

In this embodiment of this application, the external device 60 includes at least a processor 61 and a charging device 62. The processor 61 is configured to control the first switch 211 and the timer 213. The charging device 62 is configured to charge the cell 10. The processor 61 includes, but is not limited to, a central processing unit (CPU), a digital signal processor (DSP), an application-specific integrated circuit (ASIC), a field programmable gate array (FPGA) or another programmable logical device, a discrete gate or a transistor logical device, a discrete hardware component, or the like. The charging device 62 includes, but is not limited to, a charger, a charging machine, a charging pile, and the like.

When the temperature of the cell 10 is greater than or equal to the first temperature threshold T1, the first switch 211 performs a closing action to turn on the first branch circuit 21, so that the first branch circuit 21 is in a working state. The working state means a state in which the cell 10 is discharged through the first branch circuit 21, that is, the cell 10 is discharged through the first energy converter 212.

The cell 10 is discharged through the first energy converter 212 in at least the following three circumstances:

(1) If the temperature of the cell 10 decreases gradually, when the temperature of the cell 10 falls below a minimum value (for example, 60° C.) of a value range of the first temperature threshold T1, or when the depth of discharge of the cell 10 exceeds a depth-of-discharge threshold K0, the first switch 211 performs an opening action to let the first branch circuit 21 stop working, so that the cell 10 stops being discharged. The depth of discharge means a percentage of a discharged capacity in a rated capacity of the cell 10.

(2) If the temperature of the cell 10 continues rising, when the temperature of the cell 10 exceeds the first temperature threshold T1 but does not reach a minimum value (for example, 90° C.) of a value range of the second temperature threshold T2, the depth-of-discharge threshold K0 is adjusted so that the cell 10 continues discharging until the depth of discharge of the cell 10 reaches the adjusted depth-of-discharge threshold K0. For example, the first temperature threshold T1 is set to 60° C., the second temperature threshold T2 is set to 90° C., and the depth-of-discharge threshold K0 is set to 10%. When the temperature of the cell 10 rises to 80° C., the depth-of-discharge threshold K0 is adjusted to 30% (for example, starting from 60° C., whenever the temperature of the cell 10 rises by 10° C., K0 increases by 10% accordingly). In this way, the cell 10 discharges a larger amount of charge, thereby improving thermal stability of the cell 10.

(3) If the temperature of the cell 10 continues rising, when the temperature of the cell 10 is greater than or equal to the second temperature threshold T2, the second switch 221 performs a closing action to turn on the second branch circuit 22. In this way, both the first branch circuit 21 and the second branch circuit 22 are in the working state, so that the cell 10 is discharged through both the first energy converter 212 and the second energy converter 222.

The cell 10 is discharged through both the first energy converter 212 and the second energy converter 222 in at least the following three circumstances:

(1) If the temperature of the cell 10 decreases gradually, when the temperature of the cell 10 falls below the minimum value (for example, 90° C.) of the value range of the second temperature threshold T2 but is higher than the first temperature threshold T1, the second switch 221 performs an opening action to let the second branch circuit 22 stop working, so that the cell 10 stops being discharged through the second energy converter 222. In this case, the first branch circuit 21 is still in the working state, so that the cell 10 is still discharged through the first energy converter 212.

(2) If the temperature of the cell 10 decreases gradually, when the temperature of the cell 10 falls below the first temperature threshold T1, the first switch 211 performs an opening action to let both the first branch circuit 21 and the second branch circuit 22 stop working, so that the cell 10 stops being discharged.

(3) If the temperature of the cell 10 continues rising, the depth-of-discharge threshold K0 is adjusted to 100%, so that the cell 10 continues being discharged through both the first energy converter 212 and the second energy converter 222 until the cell 10 is fully discharged, that is, until the discharged capacity of the cell 10 is the rated capacity.

Referring to Table 1, Table 1 shows the set values of the first temperature threshold T1, the depth-of-discharge threshold K0, the discharge rate X, and the discharge time T. The discharge rate X means a current intensity required for discharging the cell 10 to make the discharged capacity reach the rated capacity within a specified time length.

TABLE 1

Setting of values of the first temperature threshold T1, the depth-of-discharge threshold K0, the discharge rate X, and the discharge time T

| First temperature threshold T1 | Depth-of-discharge threshold K0 | Discharge rate X * discharge time T |
|---|---|---|
| 60° C. | 10% | 0.1 C. * 1 h |
| 70° C. | 20% | 0.1 C. * 2 h |
| 80° C. | 30% | 0.1 C. * 3 h |
| 90° C. | 40% | 0.1 C. * 4 h |

From Table 1, the following two numerical relationships are derived:

(1) The depth-of-discharge threshold K0 is in positive correlation with the first temperature threshold T1.

Specifically, when the first temperature threshold T1 is 60° C., the depth-of-discharge threshold K0 is 10%; when the first temperature threshold T1 is 70° C., the depth-of-discharge threshold K0 is 20%; when the first temperature threshold T1 is 80° C., the depth-of-discharge threshold K0 is 30%; and, when the first temperature threshold T1 is 90° C., the depth-of-discharge threshold K0 is 40%. Evidently, whenever the first temperature threshold T1 increases by 10° C., the depth-of-discharge threshold K0 increases by 10% accordingly.

(2) The depth-of-discharge threshold K0 correlates with the discharge rate X and the discharge time T. When the discharge rate X is constant, the depth-of-discharge threshold K0 is in positive correlation with the discharge time T.

Specifically, the discharge rate X is set to 0.1 C. When the depth-of-discharge threshold K0 is 10%, the discharge time T is 1 hour; when the depth-of-discharge threshold K0 is 20%, the discharge time T is 2 hours; when the depth-of-discharge threshold K0 is 30%, the discharge time T is 3 hours; and when the depth-of-discharge threshold K0 is 40%, the discharge time T is 4 hours. Evidently, with the discharge rate X being constant, whenever the depth-of-discharge threshold K0 increases by 10%, the discharge time T increases by 1 hour accordingly.

In this embodiment of this application, the first energy converter 212 and the second energy converter 222 each include at least one power consumption device. The power consumption device includes, but is not limited to: a mechanical energy device, an acoustic energy device, or an optical energy device. When there are two or more power consumption devices, the power consumption devices are connected to each other in parallel and/or in series.

Figure 7:
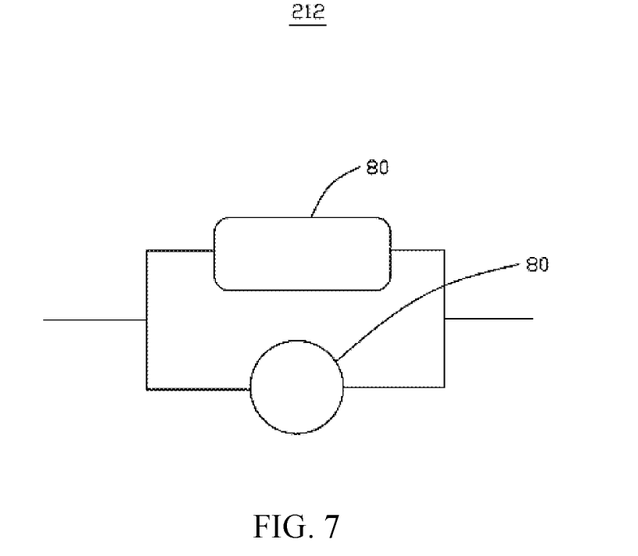
FIG. 7 is a schematic diagram of a first energy converter.
Figure 8:
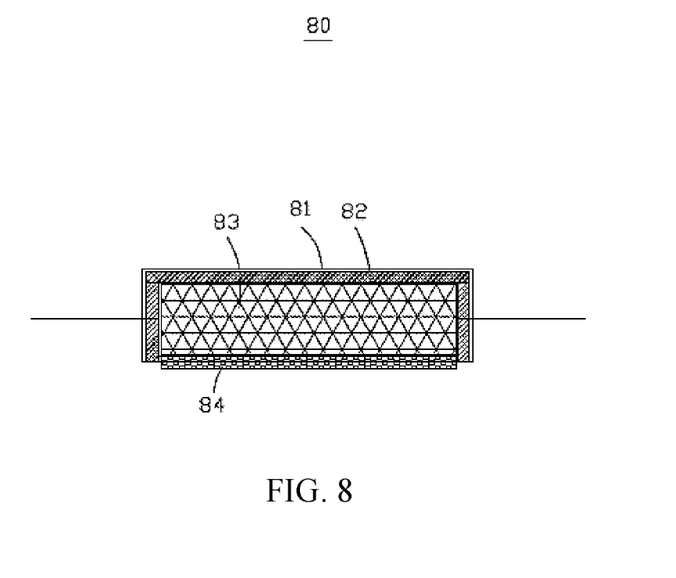
FIG. 8 is a schematic structural diagram of a power consumption device according to an embodiment.
Figure 9:
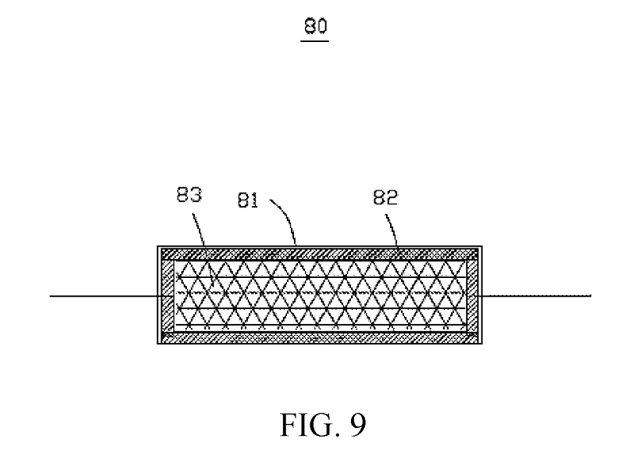
FIG. 9 is a schematic structural diagram of a power consumption device according to another embodiment.
Figure 10:
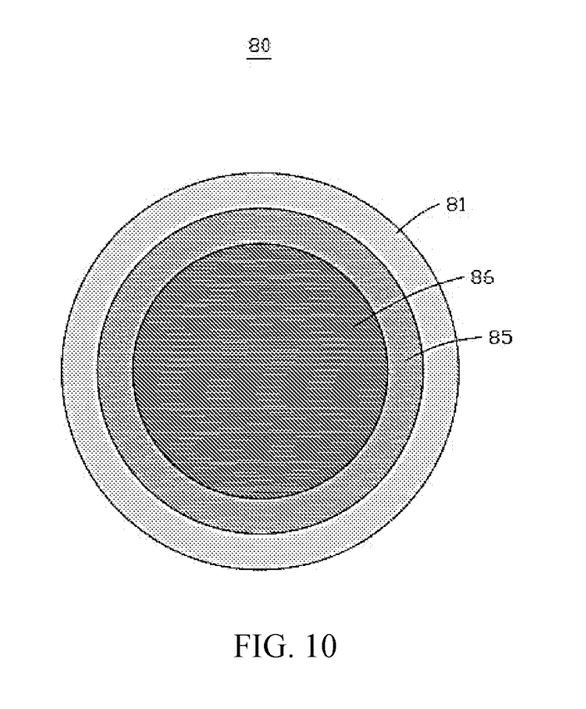
FIG. 10 is a schematic structural diagram of a power consumption device according to another embodiment.

Referring to FIG. 1 and FIG. 7 to FIG. 10, FIG. 7 is a schematic diagram of the first energy converter 212. The first energy converter 212 includes two power consumption devices 80. The two power consumption devices 80 connected in parallel. FIG. 8 to FIG. 10 are all schematic structural diagrams of the power consumption devices 80. FIG. 8 differs from FIG. 9 in that the power consumption devices 80 in FIG. 8 include a thermally conductive part 84. FIG. 8 differs from FIG. 10 in the energy conversion mode of the two power consumption devices 80.

Specifically, in FIG. 8, the power consumption devices 80 include a housing 81, a heat insulation layer 82, a resistor 83, and a thermally conductive part 84. The heat insulation layer 82 is disposed between the housing 81 and the resistor 83, and the heat insulation layer 82 partly encloses the resistor 83. The resistor 83 is coated with the housing 81 and the heat insulation layer 82, thereby preventing the temperature of the cell 10 from being affected by the heat emitted by the resistor 83. The thermally conductive part 84 is disposed between the resistor 83 and a top sealing flap 13 of the cell 10, and contacts the top sealing flap 13. The resistor 83 converts electrical energy into heat energy, and the heat energy is transferred to the top sealing flap 13 through the thermally conductive part 84. The top sealing flap 13 accumulates heat. As the temperature keeps rising, the sealing strength of the top sealing flap 13 decreases gradually. When the sealing strength of the top sealing flap 13 falls below a threshold, the top sealing flap 13 is disrupted, resulting in the disruption of a packaging bag of the cell 10. In this way, the heat accumulated inside the top sealing flap 13 is released out of the cell 10 to reduce the temperature inside the cell 10. The thermally conductive part 84 may be a metal sheet. FIG. 9 differs from FIG. 8 in that the thermally conductive part 84 is not an integral part of the power consumption devices 80, and the heat insulation layer 82 fully encloses the resistor 83.

In FIG. 10, the power consumption devices 80 include a housing 81, a magnetic part 85, and a rotor 86. The magnetic part 85 is disposed between the housing 81 and the rotor 86. The magnetic part 85 fully encloses the rotor 86. When a current flows through the magnetic part 85, a magnetic field is generated around the magnetic part 85. By cutting a magnetic induction line, the rotor 86 converts the electrical energy released by the cell 10 into mechanical energy, thereby consuming the amount of charge of the cell 10. The magnetic part 85 may be a magnet.

In this embodiment of this application, the resistance R of the first energy converter 212 is expressed by Formula (1):

$$R=U/(X*Y) \qquad (1)$$

where, Y is the rated capacity of the cell 10, U is the output voltage of the cell 10, and X is the discharge rate of the cell 10.

For example, the rated capacity Y of the cell 10 is set to 5 Ah, the output voltage U is set to 4.45 V, and the discharge rate X is set to 0.1 C. Therefore, the resistance of the first energy converter 212 is R=4.45/((0.1*5)=8.9) ohms.

The power W of the first energy converter 212 is expressed by Formula (2):

$$W=U*(K*Y/T) \qquad (2)$$

where, K is the depth of discharge of the cell 10, and T is the discharge time of the cell 10.

For example, the rated capacity Y of the cell 10 is set to 5 Ah, the output voltage U is set to 4.45 V, the discharge time T is set to 8 minutes, and the depth of discharge K is set to 10%. Therefore, the power of the first energy converter 212 is W=4.45*((10%*5)/(8/60))=16.68 watts.

The value ranges of the depth of discharge K and the discharge time T depend on the thermal stability of the cell 10. For example, if the thermal stability of the cell 10 is low, the depth of discharge K may be adjusted up to make the cell 10 release a larger amount of charge in a shorter discharge time, thereby improving the thermal stability of the cell 10.

An upper limit of the power W of the first energy converter 212 depends on a heat-resistance upper limit of the cell 10. If the power W of the first energy converter 212 exceeds the upper limit, the temperature of the first energy converter 212 may be too high, and may ignite the cell 10 or other components.

Optionally, the resistance R of the first energy converter 212 is greater than 2 Ohms, and the temperature of the first energy converter 212 does not exceed 400° C.

Understandably, in this embodiment of this application, the specific implementation of the first energy converter 212 is also applicable to the second energy converter 222. The energy conversion mode of the first energy converter 212 is independent of the energy conversion mode of the second energy converter 222.

In this embodiment of this application, the first switch 211 includes a recoverable switch and an unrecoverable switch. The recoverable switch means a switch that can switch states between a closed state and an open state repeatedly. The unrecoverable switch means a switch that can change the state only once, that is, from a closed state to an open state or from an open state to a closed state.

Figure 11:
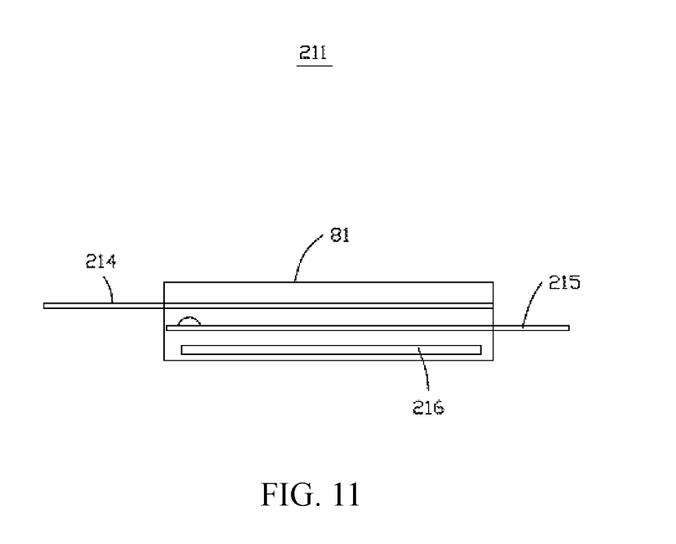
FIG. 11 is a schematic structural diagram of a first switch according to an embodiment.
Figure 12:
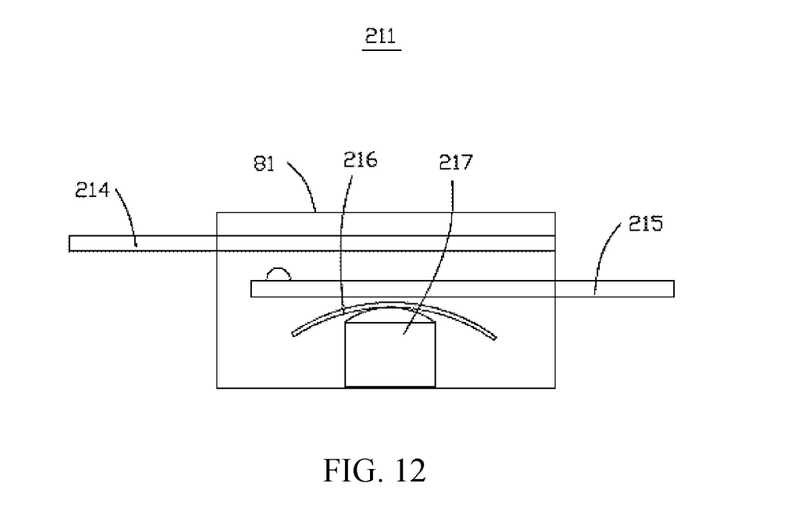
FIG. 12 is a schematic structural diagram of a first switch according to another embodiment.
Figure 13:
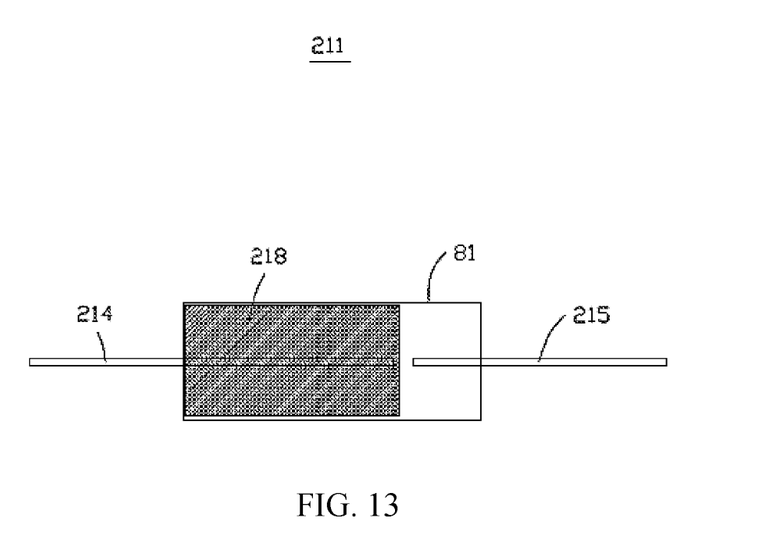
FIG. 13 is a schematic structural diagram of a first switch according to another embodiment.

Referring to FIG. 6 and FIG. 11 to FIG. 13, FIG. 11 to FIG. 13 are all schematic structural diagrams of the first switch 211. The first switches 211 in both FIG. 11 and FIG. 12 are the recoverable switch. FIG. 11 differs from FIG. 12 in that the first switch 211 in FIG. 12 includes a prop structure 217. The first switch 211 in FIG. 13 is the unrecoverable switch.

Specifically, in FIG. 11, the first switch 211 includes a housing 81, a first conductive terminal 214, a second conductive terminal 215, and an elastic part 216. The first conductive terminal 214 is electrically connected to the first tab 11 or the second tab 12. The second conductive terminal 215 is electrically connected to the first energy converter 212. Under a normal temperature, the first conductive terminal 214 and the second conductive terminal 215 do not contact each other. The second conductive terminal 215 is disposed between the first conductive terminal 214 and the elastic part 216. The elastic part 216 is elastically deformed upon a temperature change to push the second conductive terminal 215 to contact the first conductive terminal 214, so that the first switch 211 performs a dosing action. The elastic part 216 may be a double-layer metal spring. Under a high temperature, the expansion coefficient of each layer of metal spring is different. The elastic part 216 is in the shape of a flat plate under a normal temperature. After elastic deformation occurs under a high temperature, the deformed elastic part 216 is in the parabolic shape that flares upward, and pushes the second conductive terminal 215 to bend upward until contacting the first conductive terminal 214, so that the first switch 211 performs a closing action.

FIG. 12 differs from FIG. 11 in that the first switch 211 in FIG. 12 further includes a prop structure 217, and the elastic part 216 is disposed between the prop structure 217 and the second conductive terminal 215. Under a normal temperature, the elastic part 216 is in the parabolic shape that flares downward. The prop structure 217 is located on a down-flaring side of the elastic part 216, and is configured to prop the elastic part 216. After the elastic part 216 is elastically deformed under a high temperature, the deformed elastic part 216 is in the parabolic shape that flares upward and pushes the second conductive terminal 215 to bend upward until contacting the first conductive terminal 214, so that the first switch 211 performs a closing action.

In FIG. 13, the first switch 211 includes a housing 81, a first conductive terminal 214, a second conductive terminal 215, and a metal block 218. The first conductive terminal 214 is electrically connected to the first tab 11 or the second tab 12. The second conductive terminal 215 is electrically connected to the first energy converter 212. Under a normal temperature, the first conductive terminal 214 and the second conductive terminal 215 do not contact each other. The metal block 218 partly contacts the first conductive terminal 214. The metal block 218 melts into a liquid state under a high temperature. The molten metal block 218 flows to the second conductive terminal 215 to make the first conductive terminal 214 contact the second conductive terminal 215, so that the first switch 211 performs a closing action.

In other embodiments, the metal block 218 at least partly contacts the first conductive terminal 214 or the second conductive terminal 215. The melting point of the metal block 218 depends on the first temperature threshold T1. Optionally, the melting point of the metal block 218 may be set to [50, 130]° C.

Understandably, in this embodiment of this application, the specific implementation of the first switch 211 is also applicable to the second switch 221.

The protection circuit 20 in this application is tested below by using two experiments. A first cell in Embodiment 1 and Embodiment 2 includes the protection circuit 20, and a second cell in Comparative Embodiment 1 and Comparative Embodiment 2 does not include the protection circuit 20.

(1) Reliability Experiment

Embodiment 1

Discharging a first cell continuously by 5% to 10% SOC at an ambient temperature of 85° C.

Specifically, when the first cell is fully charged, recording the capacity of the first cell and measuring the thickness of the first cell. Putting the first cell into a high/low temperature thermostat, increasing the temperature of the first cell to 85° C., preserving the temperature for 6 hours, and discharging the first cell at a discharge rate of 1 C during the temperature preservation until the capacity of the first cell is 95% SOC and 90% SOC separately. After the heat preservation, taking out the first cell from the high/low temperature thermostat, measuring the thickness of the first cell, discharging the first cell again at a normal temperature, and recording the residual capacity of the first cell.

Comparative Embodiment 1

Keeping a 100% SOC of a second cell at an ambient temperature of 85° C.

Specifically, when the second cell is fully charged, recording the capacity of the second cell and measuring the thickness of the second cell. Putting the second cell into a high/low temperature thermostat, increasing the temperature of the second cell to 85° C., and preserving the temperature for 6 hours. After the heat preservation, taking out the second cell from the high/low temperature thermostat, measuring the thickness of the second cell, discharging the second cell again at a normal temperature, and recording the residual capacity of the second cell.

Figure 14:
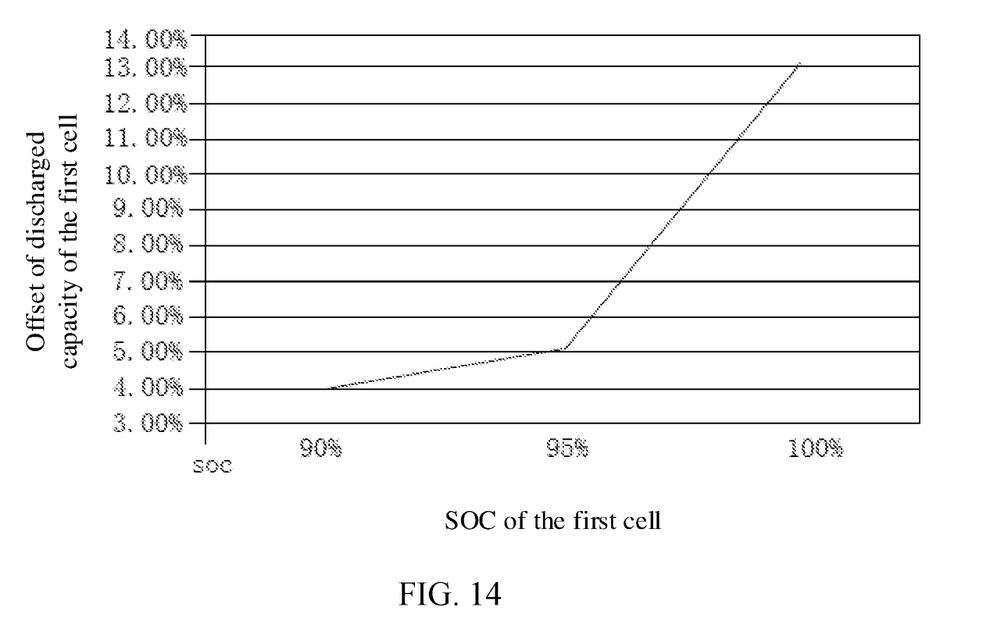
FIG. 14 shows a variation curve of a discharged capacity of a first cell.
Figure 15:
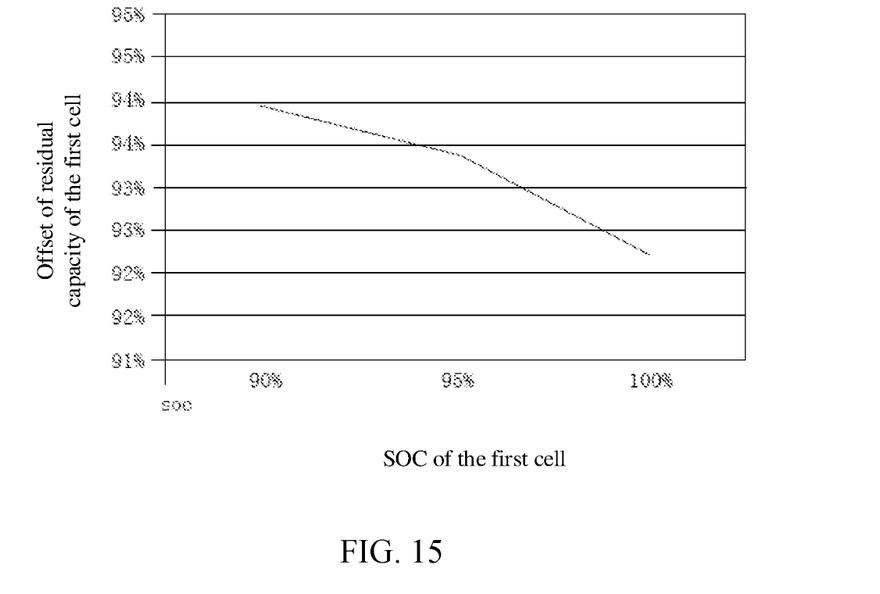
FIG. 15 shows a variation curve of a residual capacity of a first cell.

Referring to FIG. 14 and FIG. 15, FIG. 14 shows a variation curve of a discharged capacity of the first cell, and FIG. 15 shows a variation curve of the residual capacity of the first cell. As can be seen from FIG. 14 and FIG. 15, after the first cell is discharged to a specified value of SOC, the reliability of the first cell under a high temperature is improved significantly.

(2) Safety Experiment

Embodiment 2

Starting discharge of a first cell at an ambient temperature of 90° C.

Specifically, putting the first cell into a high/low temperature thermostat when the first cell is fully charged, increasing the temperature of the first cell to 140° C. at a speed of 5° C. per minute by starting from 25° C., and preserving the temperature for 30 minutes. Monitoring the temperature and the output voltage of the first cell during the test. After the test, observing whether the first cell catches fire.

Comparative Embodiment 2

Keeping a 100% SOC of a second cell.

Specifically, putting the second cell into a high/low temperature thermostat when the second cell is fully charged, increasing the temperature of the second cell to 140° C. at a speed of 5° C. per minute by starting from 25° C., and preserving the temperature for 30 minutes. Monitoring the temperature and the output voltage of the second cell during the test. After the test, observing whether the second cell catches fire.

Figure 16:
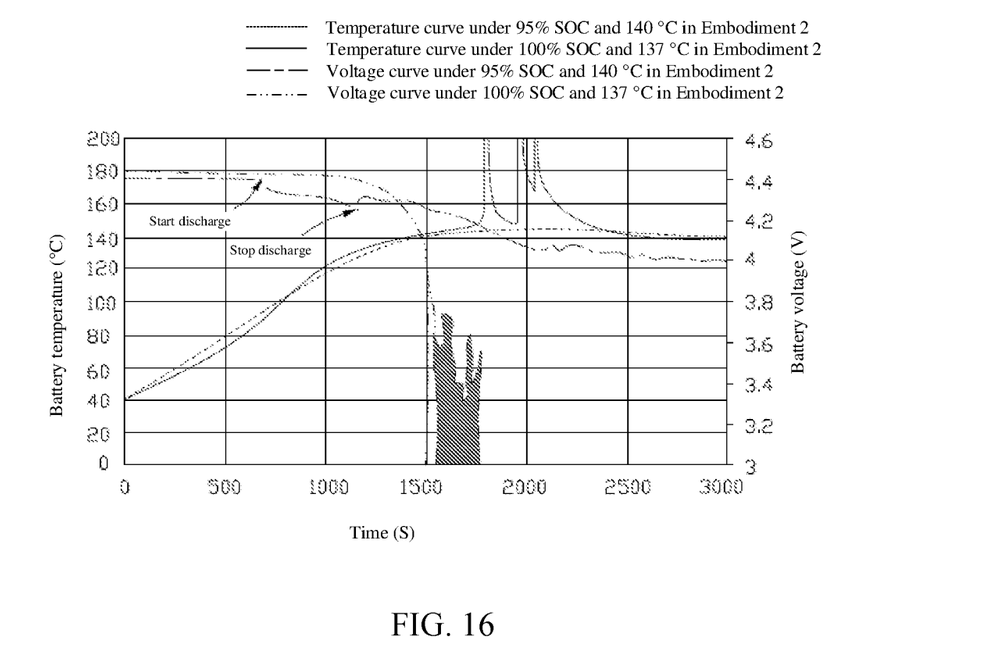
FIG. 16 shows variation curves of a temperature and an output voltage of a first cell and a second cell during a test.

Referring to FIG. 16, FIG. 16 shows variation curves of a temperature and an output voltage of a first cell and a second cell during a test. As can be seen from FIG. 16, when the temperature of the first cell reaches 90° C., starting discharging. When the temperature of the first cell reaches 130° C., the internal resistance of the first cell increases, and therefore, the discharge capability of the first cell decreases gradually until the discharge stops. After the test, the first cell does not catch fire. However, the second cell catches fire at the end of approximate 300 seconds after the temperature of the second cell reaches 140° C. By comparison, it can be seen that the safety of the first cell under a high temperature is improved significantly.

With reference to the conclusions drawn from the foregoing experiments, the first branch circuit 21 and/or the second branch circuit 22 are disposed in the protection circuit 20 according to this embodiment of this application to consume the amount of charge of the cell 10, so as to increase the heat-resistance upper limit of the cell 10. This can achieve a tradeoff between thermal stability and other performance indicators of the cell 10, and improve the thermal stability of the cell 10 without impairing other performance indicators of the cell 10, thereby improving reliability and safety of the cell 10 under a high temperature.

Figure 17:
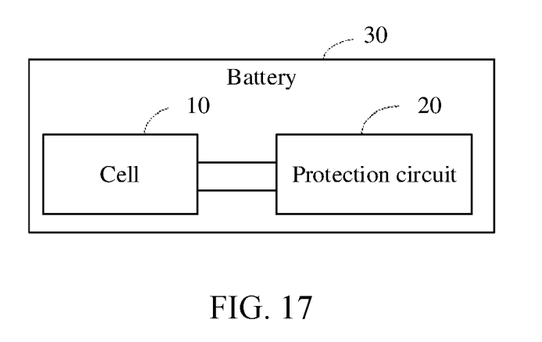
FIG. 17 is a schematic diagram of a battery.
Figure 18:
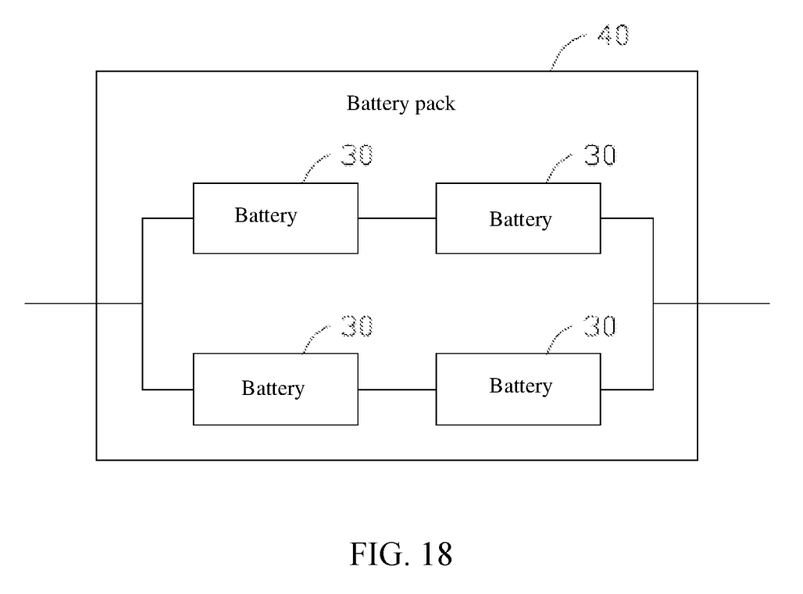
FIG. 18 is a schematic diagram of a battery pack.

Referring to FIG. 6 and FIG. 17 to FIG. 18, FIG. 17 is a schematic diagram of a battery 30, and FIG. 18 is a schematic diagram of a battery pack 40. The battery 30 includes the cell 10 and the protection circuit 20. The protection circuit 20 is electrically connected between a first tab 11 and a second tab 12 of the cell 10. The battery pack 40 includes a plurality of batteries. The plurality of batteries are connected to each other in series and/or in parallel, and the plurality of batteries include the battery 30.

An electronic device according to an embodiment of this application includes the battery 30. The electronic device includes, but is not limited to, an unmanned aerial vehicle, an electric vehicle, an electric tool, an energy storage product, and the like.

The electric tool includes, but is not limited to, an electric screwdriver, an electric drill, electric wrenches, an angle grinder, a steel profile cutting machine, an electric pick, an electric hammer, a stone crating machine, a jig saw and the like. The energy storage product includes, but is not limited to, a mobile phone, a tablet, an e-book reader, a computer, a workstation, a server, a personal digital assistant (PDA), a portable multimedia player (PMP), an MPEG-1 audio layer 3 (MP3) player, mobile medical equipment, a camera, a wearable device, a photovoltaic inverter, a wind power converter, an energy storage system, a new energy vehicle drive system, photovoltaic equipment, and the like.

Understandably, in the embodiments of this application, the specific implementation of the protection circuit 20 is also applicable to the battery 30, the battery pack 40, and the electronic device.

Although the embodiments of this application have been described in detail above with reference to drawings, this application is not limited to the foregoing embodiments. Within the knowledge of a person of ordinary skill in the art, variations may be made to the embodiments of this application without departing from the conception of this application. In addition, to the extent that no conflict occurs, the embodiments of this application and the features in the embodiments may be combined with each other.

What is claimed is:

1. A cell protection circuit, wherein the protection circuit is electrically connected between a first tab and a second tab of a cell, wherein the protection circuit comprises a first branch circuit or comprises a first branch circuit and a second branch circuit that are connected in parallel;

when a temperature of the cell is greater than or equal to a first temperature threshold, the cell is discharged through the first branch circuit; and wherein when the temperature of the cell is greater than or equal to a second temperature threshold, the cell is discharged through both the first branch circuit and the second branch circuit, wherein the second temperature threshold is greater than the first temperature threshold.

2. The protection circuit according to claim 1, wherein the first branch circuit stops working in a case that the temperature of the cell falls below a minimum value of a value range of the first temperature threshold or in a case that a depth of discharge of the cell exceeds a depth-of-discharge threshold when the cell is discharging though the first branch circuit.

3. The protection circuit according to claim 2, wherein the depth-of-discharge threshold is in positive correlation with the first temperature threshold, the first temperature threshold is greater than or equal to 60° C. and less than or equal to 90° C., and the second temperature threshold is greater than 90° C.

4. The protection circuit according to claim 3, wherein when the first temperature threshold is 60° C., the depth-of-discharge threshold is 10%; when the first temperature threshold is 70° C., the depth-of-discharge threshold is 20%; when the first temperature threshold is 80° C., the depth-of-discharge threshold is 30%; and, when the first temperature threshold is 90° C., the depth-of-discharge threshold is 40%.

5. The protection circuit according to claim 2, wherein the second branch circuit stops working in a case that the temperature of the cell falls below a minimum value of a value range of the second temperature threshold when the cell is discharging through second branch circuit.

6. The protection circuit according to claim 5, wherein both the first branch circuit and the second branch circuit stop working in a case that the depth of discharge of the cell is 100%.

7. The protection circuit according to claim 1, wherein the first branch circuit comprises a first switch and a first energy converter that are connected in series; and
when the temperature of the cell is greater than or equal to the first temperature threshold, the first switch performs a closing action, so that the cell is discharged through the first energy converter.

8. The protection circuit according to claim 7, wherein the second branch circuit comprises a second switch and a second energy converter that are connected in series; and
when the temperature of the cell is greater than or equal to the second temperature threshold, the second switch performs a closing action, so that the cell is discharged through the first energy converter and the second energy converter.

9. The protection circuit according to claim 8, wherein the first energy converter and the second energy converter each comprise at least one power consumption device, and the power consumption device comprises at least one of: a mechanical energy device, an acoustic energy device, or an optical energy device; and, when there are two or more power consumption devices, the power consumption devices are connected to each other in parallel and/or in series.

10. The protection circuit according to claim 9, wherein the power consumption device comprises a resistor and a heat insulation layer, and the heat insulation layer at least partly encloses the resistor.

11. The protection circuit according to claim 7, wherein the first branch circuit further comprises a timer, and the timer is connected to the first switch and the first energy converter in series, and is configured to record a discharge time of the cell.

12. The protection circuit according to claim 7, wherein a resistance R of the first energy converter is:

$$R=U/(X*Y)$$

wherein, Y is a rated capacity of the cell, U is an output voltage of the cell, X is a discharge rate of the cell, and the discharge rate means a current intensity required for discharging the cell to make a discharged capacity reach the rated capacity within a specified time length.

13. The protection circuit according to claim 12, wherein a power W of the first energy converter is:

$$W=U*(K*Y/T)$$

wherein, K is a depth of discharge of the cell, and T is a discharge time of the cell.

14. The protection circuit according to claim 7, wherein the first switch comprises:
a first conductive terminal, wherein the first conductive terminal is electrically connected to a tab, and the tab is disposed on a positive electrode or a negative electrode of the cell;
a second conductive terminal, wherein the second conductive terminal is electrically connected to the first energy converter; and
an elastic part, wherein the second conductive terminal is disposed between the first conductive terminal and the elastic part, and the elastic part is elastically deformed upon a temperature change to push the second conductive terminal to contact the first conductive terminal, so that the first switch performs the closing action.

15. The protection circuit according to claim 7, wherein the first switch comprises:
a first conductive terminal, wherein the first conductive terminal is electrically connected to a tab, and the tab is disposed on a positive electrode or a negative electrode of the cell;
a second conductive terminal, wherein the second conductive terminal is electrically connected to the first energy converter; and
a metal block, wherein the metal block at least partly contacts the first conductive terminal or the second conductive terminal, and, when the temperature of the cell is greater than or equal to the first temperature threshold, the metal block melts to implement electrical connection between the first conductive terminal and the second conductive terminal, so that the first switch performs the closing action.

16. A battery, comprising a cell and a protection circuit, wherein the protection circuit is electrically connected between a first tab and a second tab of the cell, the protection circuit comprises a first branch circuit or comprises a first branch circuit and a second branch circuit that are connected in parallel;
when a temperature of the cell is greater than or equal to a first temperature threshold, the cell is discharged through the first branch circuit; and
wherein when the temperature of the cell is greater than or equal to a second temperature threshold, the cell is discharged through both the first branch circuit and the second branch circuit, wherein the second temperature threshold is greater than the first temperature threshold.

17. An electronic device, comprising a battery, the battery comprising a cell and a protection circuit, wherein the protection circuit is electrically connected between a first tab and a second tab of the cell, the protection circuit comprises a first branch circuit or comprises a first branch circuit and a second branch circuit that are connected in parallel;
when a temperature of the cell is greater than or equal to a first temperature threshold, the cell is discharged through the first branch circuit; and wherein when the temperature of the cell is greater than or equal to a second temperature threshold, the cell is discharged through both the first branch circuit and the second branch circuit, wherein the second temperature threshold is greater than the first temperature threshold.

* * * * *